United States Patent

Halpern

[15] 3,679,832

[45] July 25, 1972

[54] THREE-CHANNEL FM STEREO TRANSMISSION

[72] Inventor: Samuel Walters Halpern, Matawan, N.J.

[73] Assignee: Bell Telephone Laboratories, Incorporated, Murray Hill, N.J.

[22] Filed: March 23, 1971

[21] Appl. No.: 127,286

[52] U.S. Cl. .......... 179/15 BT

[51] Int. Cl. .......... H04h 5/00

[58] Field of Search .......... 179/15 BT; 178/5.2 R

[56] References Cited

UNITED STATES PATENTS

| | | | |
|---|---|---|---|
| 2,811,577 | 10/1957 | Luck | 178/5.2 R |
| 3,534,172 | 10/1970 | Weeda | 179/15 BT |
| 3,221,098 | 11/1965 | Feldman | 179/15 BT |

OTHER PUBLICATIONS

" Quadrasonics On–The–Air" by Feldman Audio Magazine Jan. 1970

" The Quart Broadcasting System" by Gerzon Audio Magazine, September 1970.

" Quadiative Quadrature with Reference Tone" by Gerzon Radio-Electronics Magazine Dec. 1970

*Primary Examiner*—William C. Cooper
*Assistant Examiner*—Thomas D'Amico
*Attorney*—R. J. Guenther and E. W. Adams, Jr.

[57] ABSTRACT

An FM stereo system wherein the composite baseband transmission signal comprises three independent audio signals added together to obtain a sum signal; three double-sideband, amplitude-modulated, suppressed-carrier signals, each corresponding to one of the audio signals and spaced one hundred twenty degrees apart in phase; a conventional phase reference pilot signal; and a second, mode switching, pilot signal that comprises the third harmonic of the phase reference pilot. The second pilot signal assures three-channel receiver compatibility with a monophonic or two-channel stereophonic broadcast.

11 Claims, 7 Drawing Figures

INVENTOR
S. W. HALPERN
BY
John K. Mullarney
ATTORNEY

THREE-CHANNEL FM STEREO TRANSMISSION

BACKGROUND OF THE INVENTION

This invention relates to a three-channel FM stereo multiplex transmission system that is particularly compatible with existing monophonic and two-channel stereophonic receivers.

Present day stereophonic broadcasts must be conducted in accordance with certain standards established by the Federal Communications Commission (FCC). Since there are vast quantities of monaural FM receivers in use, it is essential that any system of FM stereo broadcasting permit reproduction of the program signal through such existing receivers. In addition to this monaural equipment compatibility, an FM stereo broadcast must also be compatible with subsidiary communication authorization (SCA) transmission. For those not familiar with SCA, it consists of a narrow band FM transmission centered at 67 kHz, intended primarily for medium-fidelity transmission of "background" music for commercial establishments, such as stores and restaurants.

In the existing two-channel stereophonic system approved by the FCC, two stereophonically related signals are initially added together to produce a sum signal which is used directly for frequency modulation of a transmission carrier. The stereo signals are also combined to produce a difference signal and this difference signal is used to amplitude-modulate a subcarrier signal having a frequency substantially greater than, preferably more than twice, the highest audio frequency to be transmitted. Supressed-carrier amplitude modulation of the subcarrier is employed with respect to the difference signal. The amplitude-modulated subcarrier is also utilized to frequency modulate the transmission carrier. In addition, a relatively low-level phase reference pilot or synchronization signal is utilized as a part of the frequency modulation signal. This pilot signal, which may advantageously have a frequency of half the fundamental of the subcarrier, is typically employed to accomplish synchronous detection at the receiver stations. The aforementioned sum signal can be handled by a conventional monaural FM receiver. It will reproduce as a good monaural program, comparable to that transmitted by any monaural FM broadcasting station. The frequency bandwidth of the suppressed-subcarrier signal extends over a range that lies below the SCA band and, therefore, the required monaural and SCA compatibilities are met.

A two-channel system has long been known to possess certain shortcomings, and the inclusion of a third (or even a fourth) independent audio channel has been shown to be superior to a two-channel system; see, for example, "Symposium on Wire Transmission of Symphonic Music and Its Reproduction in Auditory Perspective: Physical Factors", The Bell System Technical Journal, Vol. XIII, No. 2, April 1934, pages 245–258. Basically, a third-channel in the center eliminates the apparent backward shift of centrally located sound sources and reduces differences in source localization as a function of observing positions during reproduction. Three, and four, channel systems are also of obvious advantage in creating an all-surrounding sound environment (e.g., with the listener located in the center of a triangle and three speakers located at the corners or angles thereof).

Various proposals have been made heretofore for three and four channel FM stereo transmission systems. The use of pulse-time-multiplexing as a possible technique for transmitting three-channel stereophonic sound has been proposed by G. D. Browne in an article entitled "A Pulse Time Multiplex System for Stereophonic Broadcasting", Journal of the British Institute of Radio Engineers, Vol. 23, No. 2, February 1962, pages 129–137. In addition, four-channel systems have been proposed which utilize an additional multiplex channel (i.e., a second, higher frequency, subcarrier); see, for example, "Four-Channel Stereo FM—From One Station" by J. P. Meure, High Fidelity Magazine, March 1970, pages 72–73. The major shortcoming of all these proposals is that they require additional bandwidth and thus preclude the simultaneous transmission of SCA.

A three-channel FM stereo system has recently been proposed that permits the simultaneous transmission of SCA and is more-or-less "compatible" with monophonic and two-channel stereophonic receivers; see "Quadrature Ambience with Reference Tone" by Gerzon, Radio-Electronics, December 1970, page 52 et seq. Unfortunately, in this proposed system there is a degradation in the peak output signal-to-noise (S/N) ratios of monophonic and two-channel stereophonic receivers, during a three-channel broadcast, that is in excess of 6 db. Further, during a three-channel broadcast, the third-channel audio information is lost to both monophonic and two-channel stereophonic listeners.

SUMMARY OF THE INVENTION

Accordingly, it is a primary object of the present invention to provide a three-channel FM stereo transmission system that permits the simultaneous transmission of SCA and that is fully compatible with monophonic and two-channel stereophonic FM receiver equipment.

A related object of the invention is to provide an improved three-channel FM stereo transmission system that is fully compatible with monophonic and two-channel stereophonic FM receivers without significant degradation to their output signal-to-noise ratios.

In accordance with the present invention, three independent sources of stereophonically related audio frequency waves are added together to obtain a sum signal. Each audio frequency wave is also used to amplitude-modulate a respective subcarrier signal, these subcarrier signals being of the same frequency and spaced one hundred 20° apart in phase. A suppressed-carrier, double-sideband modulation of each subcarrier is employed, with the frequency of said subcarrier signals being sufficiently high as to assure a frequency gap between the lower sidebands of the modulated subcarrier signals and said sum signal. To achieve the desired compatibility with monophonic and two-channel stereophonic FM receivers, the amplitude of each double-sideband suppressed-carrier signal is multiplied by a factor of $2/\sqrt{3}$. A conventional low-level phase reference pilot signal, lying within the aforementioned frequency gap, is employed for receiver detection purposes. A second pilot signal, of one-third the amplitude of the third harmonic of the phase reference pilot, is utilized to achieve three-channel receiver compatibility with a monophonic or two-channel stereophonic broadcast. The aforementioned sum signal, the three double-sideband suppressed-carrier signals, and the two pilot signals are frequency modulated onto a high frequency FM carrier for transmission purposes.

The composite, frequency modulated, carrier signal is transmitted to one or more remote receivers, which may be of the conventional monophonic or two-channel stereophonic type or preferably a three-channel stereo receiver constructed in accordance with the invention. Typically, a plurality of receivers of each type will receive and reproduce the three-channel broadcast, each in accordance with its respective mode of operation. Compatibility of the three-channel stereophonic receiver with a one-channel or two-channel broadcast is achieved by the use of the second pilot signal. In the absence of this pilot, a three-channel receiver will operate in a conventional manner to reproduce a monophonic or two-channel stereophonic broadcast. The second pilot signal is used as an indicator for a three-channel broadcast and when the same is received by a three-channel receiver it serves to switch the latter into a three-channel stereophonic reception mode. Thus, a three-channel broadcast is compatible with a one, two or three-channel receiver, while a three-channel receiver constructed in accordance with the invention is compatible with a one, two or three-channel broadcast.

In accordance with a feature of the invention, the instantaneous frequency deviation of the FM carrier is not increased by the inclusion of the second pilot signal, since it is equal to one-third the amplitude of the third harmonic of the phase reference pilot and has reverse polarity at the peak.

A still further and particularly advantageous feature is that a three-channel FM stereo broadcast, in accordance with the invention, is actually more than compatible with monophonic and two-channel stereophonic FM receivers in that it enhances the performance of the same by augmenting the normal output signals therefrom with the third-channel audio information.

BRIEF DESCRIPTION OF THE DRAWINGS

The invention will be more fully appreciated from the following detailed description when considered in connection with the accompanying drawings in which.

DETAILED DESCRIPTION

Figure 1:
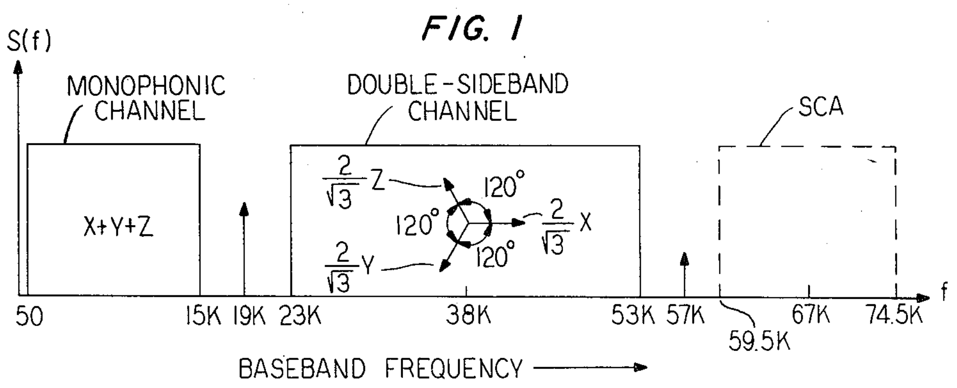
FIG. 1 is a frequency diagram of the composite baseband signal developed in accordance with the principles of the present invention.

Before describing the present invention, it might prove advantageous to briefly review the basic principles of the existing two-channel stereo system approved by the FCC. The stereophonically related signals that are added together constitute a "monophonic channel" which consists of a $(Y + Z)$ signal of 50 to 15,000 Hz, where Y and Z represent the left and right independent audio signals or channels. It is this combined signal that is reproduced by a standard monaural FM receiver, hence the descriptive term "monophonic channel". To this, a double-sideband suppressed 38 kHz subcarrier signal of $(Y - Z) \sin \omega_s t$ is added along with a pilot of 19 kHz. The composite modulation signal can be written as:

$$e_m = (Y+Z) + (Y-Z) \sin \omega_s t + M \sin (\omega_s t/2) \qquad (1)$$

where $f_s = 38$ kHz, and M is the amplitude of the 19 kHz pilot. Looking at the baseband spectrum, one would find a $(Y + Z)$ monophonic channel from 50 Hz to 15 kHz, a 19 kHz pilot, and a $(Y - Z) \sin \omega_s t$ signal from 23 to 53 kHz. If SCA is also being transmitted, one finds an SCA frequency modulated subcarrier band from 59.5 to 74.5 kHz.

In the three-channel stereophonic system of the present invention, an independent third or center channel (X) is added to the monophonic channel consisting of $(Y + Z)$. To this modified monophonic channel, three double-sideband 38 kHz signals, each corresponding to one of the audio signals and spaced 120° apart in phase, are added along with two pilot signals at 19 kHz and 57 kHz, all as shown in FIG. 1. For reasons which will be more evident hereinafter, the amplitude of each one of the double-sideband signals is multiplied by a factor of $2/\sqrt{3}$. Thus, the composite baseband signal of this three-channel stereophonic system can be written as follows:

$$e_m = (X+Y+Z) + \frac{2}{\sqrt{3}} X \cos \omega_s t + \frac{2}{\sqrt{3}} Y \cos\left(\omega_s t - \frac{2}{3}\pi\right) + \frac{2}{\sqrt{3}} Z \cos\left(\omega_s t - \frac{4}{3}\pi\right) + M \sin \frac{\omega_s t}{2} + \frac{M}{3} \sin \frac{3}{2} \omega_s t \qquad (2)$$

where $X$, $Y$ and $Z$ are three independent audio channels (e.g., center, left and right), $\omega_s = 2\pi f_s (f_s = 38$ kHz), and M is again the amplitude of the 19 kHz pilot.

Figure 2:
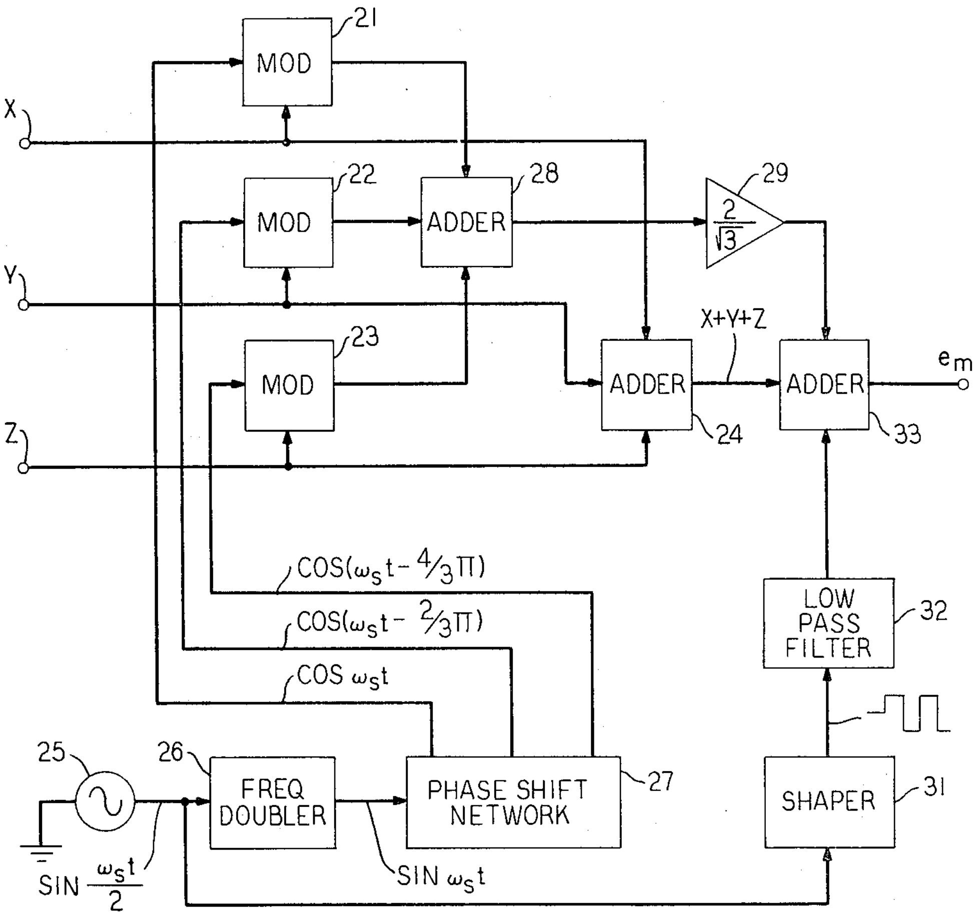
FIG. 2 illustrates a simplified schematic block diagram of a transmitting terminal for generating the composite signal of FIG. 1.

The transmitter for generating this composite signal is illustrated in the schematic block diagram of FIG. 2. For purposes of simplicity, some of the more conventional transmitter circuits (e.g., pre-emphasis networks, carrier frequency source and carrier frequency modulator) have not been shown and will be mentioned only briefly, where necessary, hereinafter. The three audio frequency signals $X$, $Y$ and $Z$, derived from three independent sources (not shown), are applied via pre-emphasis networks (not shown) to the inputs of modulators 21, 22 and 23, respectively. The $X$, $Y$ and $Z$ signals are also delivered to adder 24 where they are linearly combined.

The subcarrier and pilot signals are derived from the source 25, which is designed to provide an output sine wave signal of 19 kHz, or $\sin (\omega_s t/2)$. This signal frequency is doubled in frequency doubler 26 and the resultant $\sin \omega_s t$ signal is delivered to the input of phase shift network 27. The network 27 may comprise any one of the known arrangements for providing discrete phase shifted e.g., delayed) signals. The three 38 kHz subcarrier output signals of phase shift network 27 are spaced 120° apart in phase and each is delivered to a respective one of the modulators 21, 22 and 23, all as indicated in FIG. 2. The modulators 21–23 comprise suppressed-carrier amplitude modulators of known construction which serve to amplitude-modulate the three subcarriers with the respective audio frequency signals so as to produce the three double-sideband, suppressed-carrier, amplitude-modulated subcarrier signals $X \cos \omega_s t$, $Y \cos (\omega_s t - \frac{2}{3}\pi)$, and $Z \cos (\omega_s t - (4/3)\pi)$. These latter signals are then combined in adder 28 and multiplied by a factor of $2/\sqrt{3}$ in amplifier 29.

The 19 kHz sine wave signal of source 25 is delivered to a shaper 31 of known construction wherein it is shaped (by amplification and clipping) to a 19 kHz square wave. A square wave, it will be recalled, is a synthesis of its Fourier components (i.e., $\sin \omega t + \frac{1}{3} \sin 3\omega t + 1/5 \sin 5\omega t + 1/7 \sin 7\omega t$ - - - ). Accordingly, the low pass filter 32 can be used to derive the desired 19 kHz phase reference pilot and the 57 kHz mode switching pilot from the shaped 19 kHz square wave.

The use of one-third amplitude of the third harmonic of the 19 kHz pilot for the second pilot signal is particularly advantageous. First, this third harmonic signal (at 57 kHz) lies in the frequency gap between the upper sidebands of the modulated subcarrier signals and the SCA band, as shown in FIG. 1. Furthermore, the instantaneous frequency deviation of the FM carrier is not increased by the addition of the second pilot signal and therefore its inclusion in the baseband signal does not require any additional reduction in the peak amplitude of the audio channels. This can be appreciated when one realizes that a signal comprising $\sin \omega t + \frac{1}{3} \sin 3\omega t$ has a peak amplitude that is actually slightly less than the peak amplitude of $\sin \omega t$.

The $(X + Y + Z)$ signal, the three double-sideband subcarrier signals and the two pilot signals are combined in adder 33 to form the composite baseband signal set forth in equation 2, supra. If SCA is to be simultaneously broadcast, it is simply added to this composite signal. The composite output signal is then frequency modulated (not shown) onto a high frequency FM carrier for transmission purposes. This high frequency carrier will typically lie in the range 88–108 mHz.

Figure 4A:
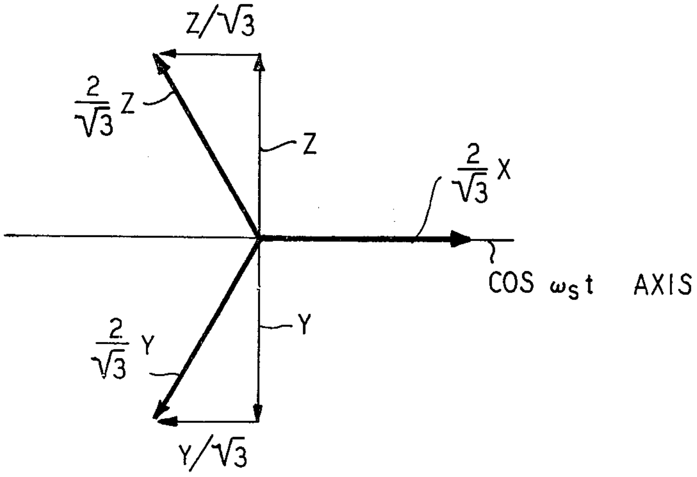
FIGS. 4A through 4C are vector diagrams useful in the explanation of the invention.
Figure 4B:
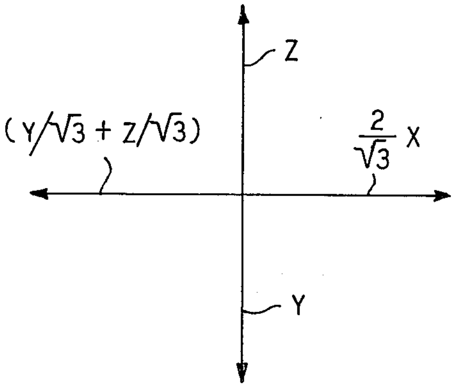
Figure 4C:
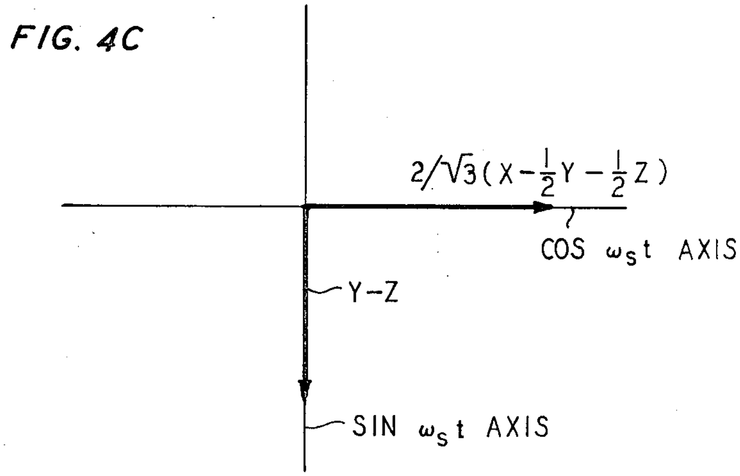

FIG. 4A is a vector diagram of the three modulated subcarrier signals, each multiplied by a factor of $2/\sqrt{3}$ as heretofore described. The $(2/\sqrt{3})X$ vector lies along the $\cos \omega_s t$ axis, while the $(2/\sqrt{3})Y$ and $(2/\sqrt{3})Z$ vectors are respectively phase shifted $\frac{2}{3}\pi$ (or 120°) and $4/3\pi$ (or 240°) with respect thereto. Remembering that $\sin 60° = \sqrt{3/2}$ and $\cos 60° + \frac{1}{2}$, the $(2/\sqrt{3})Y$ vector can be reduced to its vector components of Y and $Y/\sqrt{3}$, as shown in FIG. 4A. The same can be done for the $(2/\sqrt{3})Z$ vector. In FIG. 4B, the in-phase $Y/\sqrt{3}$ and $Z/\sqrt{3}$ vector components of FIG. 4A are added together to produce the sum vector $(Y/\sqrt{3} + Z/\sqrt{3})$. And the vectors of FIG. 4B can be reduced, by algebraic addition, to two vector quantities in phase quadrature, as indicated in FIG. 4C. Thus, the three phase-shifted vectors of FIG. 4A (i.e., $(2/\sqrt{3})X$, $(2/\sqrt{3})Y$, $(2/\sqrt{3})Z$) can be resolved into the two phase-quadrature signals of FIG. 4C, namely $(2/\sqrt{3})(X - \frac{1}{2} Y - \frac{1}{2} Z)$ and $(Y - Z)$. The axis of the $(Y - Z)$ vector is phase shifted by negative ninety degrees with respect to the $\cos \omega_s t$ axis and thus it is, in effect, the $\sin \omega_s t$ axis.

From the above vector analysis it should be apparent that the composite signal defined by equation (2) can be rewritten with the three 38 kHz double-sideband (DSB) signals expressed in terms of two phase-quadrature components. Therefore:

$$e_m = (X+Y+Z) + \frac{2}{\sqrt{3}}\left(X - \frac{1}{2}Y - \frac{1}{2}Z\right)\cos\omega_s t$$
$$+ (Y-Z)\sin\omega_s t + M\sin\frac{\omega_s t}{2} + \frac{M}{3}\sin\frac{3}{2}\omega_s t. \quad (3)$$

The first term in this equivalent mathematical expression is the monophonic term, i.e., that which will be detected and reproduced by a monophonic listener. The $(Y - Z)$ sin $\omega_s t$ term is the same as the 38 kHz DSB signal that is present in a conventional two-channel broadcast (see equation 1) and M sin $(\omega_s t/2)$ is the same phase reference pilot signal. The additional terms present, over and above those of a standard two-channel broadcast, are the cos $\omega_s t$ quadrature term and the additional pilot at $(3/2)f_s$ for three-channel receiver compatibility.

The equations (2) and (3), supra, are mathematically equivalent and FM receiver operation is the same regardless of how the composite transmission signal $(e_m)$ is expressed mathematically. That is, while the composite transmission signal comprises three, phase shifted, DSB subcarrier signals, it will be treated by an FM detector as though it is comprised of the sin $\omega_s t$ and cos $\omega_s t$ phase-quadrature terms of equation (3). Accordingly, in the following discussion, FM receiver operation will be described in accordance with the mathematical expression set forth in equation (3).

As in the case of a two-channel broadcast, a monophonic listener will receive only the monophonic channel (i.e., $X + Y + Z$) since all other signals in the baseband are above 15 kHz. A conventional two-channel stereophonic receiver will detect the $(Y - Z)$ sin $\omega_s t$ term, in the same manner as heretofore, and when this detected signal is effectively combined in phase and out of phase with the $(X + Y + Z)$ monophonic signal the following output signals will be obtained:

$$e_L = 2Y + X, \text{ and}$$
$$e_R = 2Z + X. \quad (4)$$

The two-channel receiver is insensitive to the cos $\omega_s t$ term since it is in phase-quadrature with the $(Y - Z)$ double-sideband signal. Accordingly, a three-channel broadcast in accordance with the invention is fully compatible with existing monophonic and two-channel stereophonic receivers. Moreover, since the third-channel audio information (i.e., the X signal) augments the normal output signals of the monophonic and two-channel stereophonic receivers, the three-channel broadcast of the invention substantially enhances the performance of the latter receivers.

Figure 3:
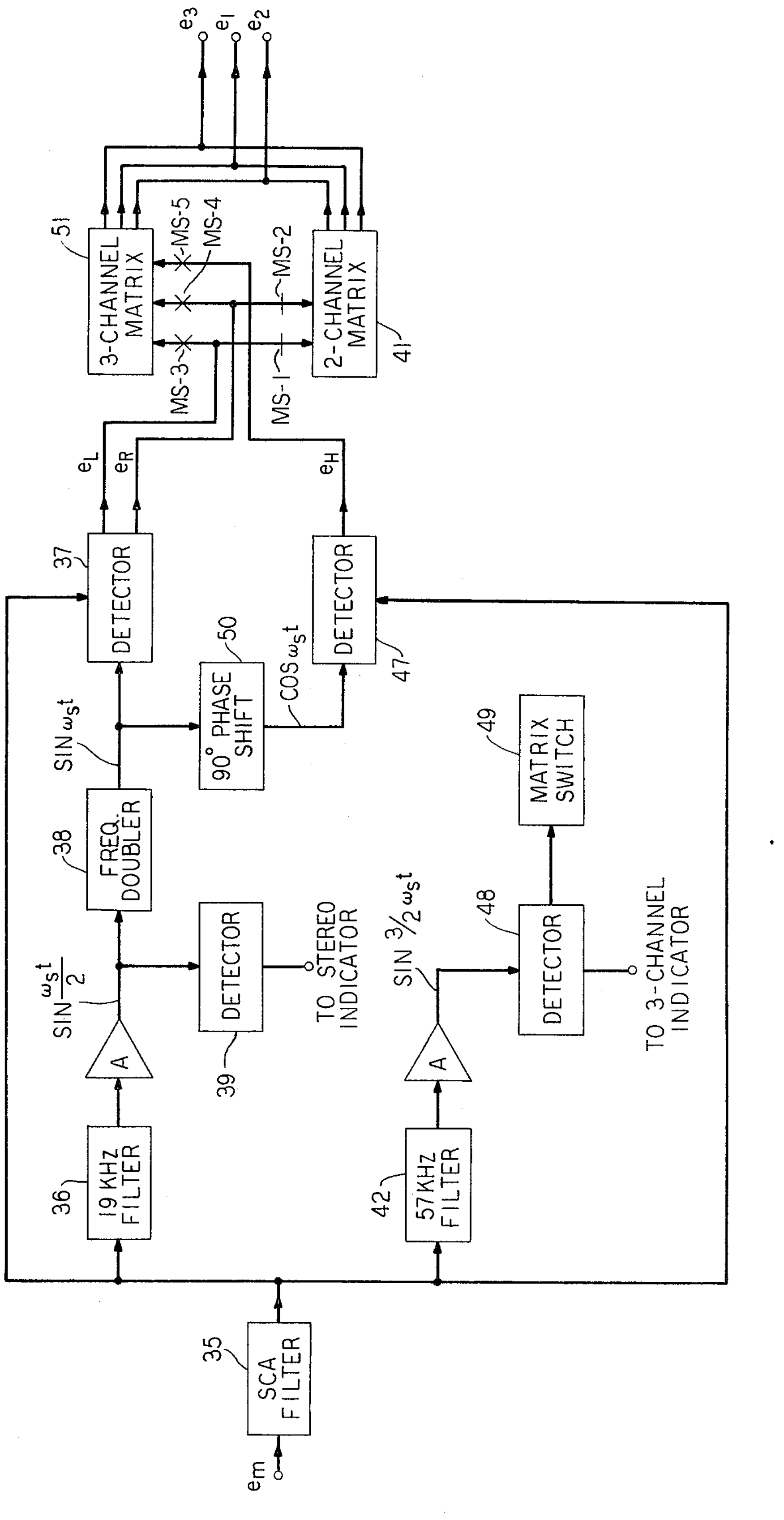
FIG. 3 illustrates a simplified schematic block diagram of a receiving terminal in accordance with the invention.

A three-channel receiver, in accordance with the invention, is shown in the schematic block diagram of FIG. 3. Here again, for purposes of simplicity, some of the more conventional FM receiver circuits (e.g., RF and IF stages, discriminator, and deemphasis networks) have not been shown and will be mentioned only briefly, where necessary, hereinafter. In addition to reproducing a three-channel broadcast, in the manner to be described, this receiver is fully compatible with conventional monophonic and two-channel stereophonic broadcasts.

A received FM signal is amplified in the RF and IF stages (not shown), demodulated in the discriminator (not shown), and then coupled through an SCA filter 35 to the input terminals of the 19 kHz filter 36 and the switching detector 37. The 19 kHz reference signal $[\sin(\omega_s t/2)]$ is frequency doubled in doubler 38 and the resultant sin $\omega_s t$ signal is fed to detector 37 for detection purposes. A 19 kHz signal is, of course, indicative of a stereophonic broadcast. To advise a listener of stereo reception, it is common practice to couple the sin $(\omega_s t/2)$ signal to a detector 39 for the purpose of energizing a stereo indicator lamp (not shown). When the received FM signal contains no 19 kHz pilot (as with monaural FM), the stereo indicator lamp is not energized. So far, this much of the receiver circuit is identical to a conventional two-channel stereophonic receiver.

A typical prior art detection circuit 37 that can be advantageously utilized herein comprises a pair of transistors connected in a push-pull type configuration. The baseband signal $(e_m)$ is coupled to the emitters, while the sin $\omega_s t$ reference signal is delivered in push-pull to the transistor bases. The transistors conduct alternately and develop the signals $e_L$ and $e_R$ at the respective transistor collectors, where $e_L$ and $e_R$ represent the left and right channel audio information. However, it is to be understood that the present invention is in no way limited to this particular prior art detection circuit and other known FM detection circuits might also be readily utilized herein.

When a monaural broadcast is being received, the detector 37 output comprises $e_L = e_R = X$ (monaural signal). For a received two-channel stereo signal, the switching detector 37 will detect the $(Y - Z)$ sin $\omega_s t$ term and this, in effect, is algebraically added to and subtracted from the monophonic term of the two-channel broadcast (i.e., $Y - Z$) so as to provide the output signals $e_L = 2Y$ and $e_R = 2Z$. All of the above is typical of a conventional two-channel FM receiver's mode of operation.

The $e_L$ and $e_R$ outputs of detector 37 are coupled via deemphasis networks (not shown) to the two-channel matrix 41 via the normally closed break contacts MS–1 and MS–2. The matrix 41 comprises a resistance matrix of rather conventional design and it serves primarily to couple the dual outputs of detector 37 to the three outputs designated $e_1$, $e_2$ and $e_3$. The $e_1$, $e_2$ and $e_3$ outputs are respectively delivered to the center, left and right loudspeaker channels. For a monaural broadcast, $e_L = e_R = X$ and the matrix 41 serves to convert the same to the following:

$$e_1 = \frac{e_L + e_R}{2} = X,\ e_2 = e_L = X, \text{ and } e_3 = e_R = X.$$

For a conventional two-channel broadcast, $e_L = 2Y$ and $e_R = 2Z$ and the matrix output signals comprise:

$$e_1 = \frac{e_L + e_R}{2} = Y + Z,\ e_2 = e_L = 2Y, \text{ and } e_3 = e_R = 2Z.$$

Thus, the three-channel receiver of FIG. 3 is fully compatible with existing monophonic and two-channel stereophonic broadcasts.

The baseband signal $(e_m)$ is also coupled to the input terminals of the 57 kHz filter 42 and the switching detector 47. The filter output sin $(3/2)\omega_s t$ is delivered to detector 48 which in response thereto serves to energize a three-channel indicator lamp (not shown). The output of detector 48 also serves to enable the matrix switch 49. A 57 kHz pilot signal is indicative of a three-channel stereophonic broadcast and thus when the same is received the three-channel indicator lamp is energized and the receiver is switched to a three-channel reception mode by the enabling of matrix switch 49. The enabled switch 49 serves to open the break contacts MS–1 and MS—2 and to close the make contacts MS–3, MS–4 and MS–5. Any switch, electromechanical or electronic, can be utilized for this purpose.

The switching detector 47 can be similar to detector 37, except that the phase reference signal coupled thereto is cos $\omega_s t$ which is obtained by phase shifting the sin $\omega_s t$ signal in phase-shift circuit 50. Accordingly, the switching detector 47 will detect the $(2/\sqrt{3})(X - \frac{1}{2}Y - \frac{1}{2}Z)$ cos $\omega_s t$ term of equation (3) and this is effectively added to the monophonic term so as to provide the output signal $e_H$, where:

$$e_H = \frac{2}{\sqrt{3}}\left(X - \frac{1}{2}Y - \frac{1}{2}Z\right) + (X+Y+Z)$$
$$= \left(1 + \frac{2}{\sqrt{3}}\right)X + \left(1 - \frac{1}{\sqrt{3}}\right)Y + \left(1 - \frac{1}{\sqrt{3}}\right)Z. \quad (5)$$

The detector will also algebraically subtract the monophonic term from the cos $\omega_s t$ term, but the same is not needed for present purposes.

The detector 37 will detect the $(Y-Z)\sin\omega_s t$ term of equation (3) and when the same is combined with the monophonic term, as heretofore described, the following output signals are obtained: $e_L = 2Y + X$ $e_R = 2Z + X$, (6)
When these three signals $e_L$, $e_R$, and $e_H$ are fed into the three-channel matrix 51 via de-emphasis networks (not shown) and the make contacts MS-3, MS—4 and MS-5, the three independent audio signals are obtained: $e_1 = 3X$; $e_2 = 3Y$; $e_3 = 3Z$.

The mathematical method of determinants can be advantageously utilized in the design of a matrix circuit 51 for developing the signal values $e_1$, $e_2$ and $e_3$ from the detector output signals $e_L$, $e_R$ and $e_H$. The latter signals can be written as follows:

$$e_L = 1X + 2Y + 0Z$$

$$e_R = 1X + 0Y + 2Z \qquad (7)$$

$$e_H = \left(1+\frac{2}{\sqrt{3}}\right)X + \left(1-\frac{1}{\sqrt{3}}\right)Y + \left(1-\frac{1}{\sqrt{3}}\right)Z.$$

From these three linear simultaneous equations, and in accordance with the method of determinants, the value of $X$ is given by:

$$X = \frac{\begin{vmatrix} e_L & 2 & 0 \\ e_R & 0 & 2 \\ e_H & \left(1-\frac{1}{\sqrt{3}}\right) & \left(1-\frac{1}{\sqrt{3}}\right) \end{vmatrix}}{\begin{vmatrix} 1 & 2 & 0 \\ 1 & 0 & 2 \\ \left(1+\frac{2}{\sqrt{3}}\right) & \left(1-\frac{1}{\sqrt{3}}\right) & \left(1-\frac{1}{\sqrt{3}}\right) \end{vmatrix}}. \qquad (8)$$

Solving this for $X$ and eliminating the zero terms:

$$X = \frac{[4e_H] - \left[2e_L\left(1-\frac{1}{\sqrt{3}}\right) + 2e_R\left(1-\frac{1}{\sqrt{3}}\right)\right]}{4\left(1+\frac{2}{\sqrt{3}}\right)\Big] - \left[2\left(1-\frac{1}{\sqrt{3}}\right) + 2\left(1-\frac{1}{\sqrt{3}}\right)\right]}$$

$$= \frac{4e_H - 2e_L\left(1-\frac{1}{\sqrt{3}}\right) - 2e_R\left(1-\frac{1}{\sqrt{3}}\right)}{4\left(1+\frac{2}{\sqrt{3}}\right) - 4\left(1-\frac{1}{\sqrt{3}}\right)}.$$

Simplifying the denominator to $12/\sqrt{3}$ and dividing the numerator and denominator by 2:

$$X = \frac{2e_H - e_L\left(1-\frac{1}{\sqrt{3}}\right) - e_R\left(1-\frac{1}{\sqrt{3}}\right)}{\frac{6}{\sqrt{3}}}.$$

Now multiplying numerator and denominator by $\sqrt{3}$:

$$X = \frac{2\sqrt{3}\,e_H - e_L\sqrt{3}\left(1-\frac{1}{\sqrt{3}}\right) - e_R\sqrt{3}\left(1-\frac{1}{\sqrt{3}}\right)}{6}.$$

Or:

$$X = \frac{2\sqrt{3}\,e_H + e_L(1-\sqrt{3}) + e_R(1-\sqrt{3})}{6}.$$

Finally by multiplying each side of the equation by 3 we obtain:

$$3X = \frac{2\sqrt{3}\,e_H + e_L(1-\sqrt{3}) + e_R(1-\sqrt{3})}{2}.$$

The simultaneous equations (7) can, of course, be similarly solved for $3Y$ and $3Z$. Thus, the signal values $e_1$, $e_2$ and $e_3$ are defined as follows:

$$e_1 = 3X = \frac{(1-\sqrt{3})\,e_L + (1-\sqrt{3})\,e_R + 2\sqrt{3}\,e_H}{2}$$

$$e_2 = 3Y = \frac{(\sqrt{3}+5)\,e_L + (\sqrt{3}-1)\,e_R - 2\sqrt{3}\,e_H}{4} \qquad (9)$$

$$e_3 = 3Z = \frac{(\sqrt{3}-1)\,e_L + (\sqrt{3}+5)\,e_R - 2\sqrt{3}\,e_H}{4}.$$

Figure 5:
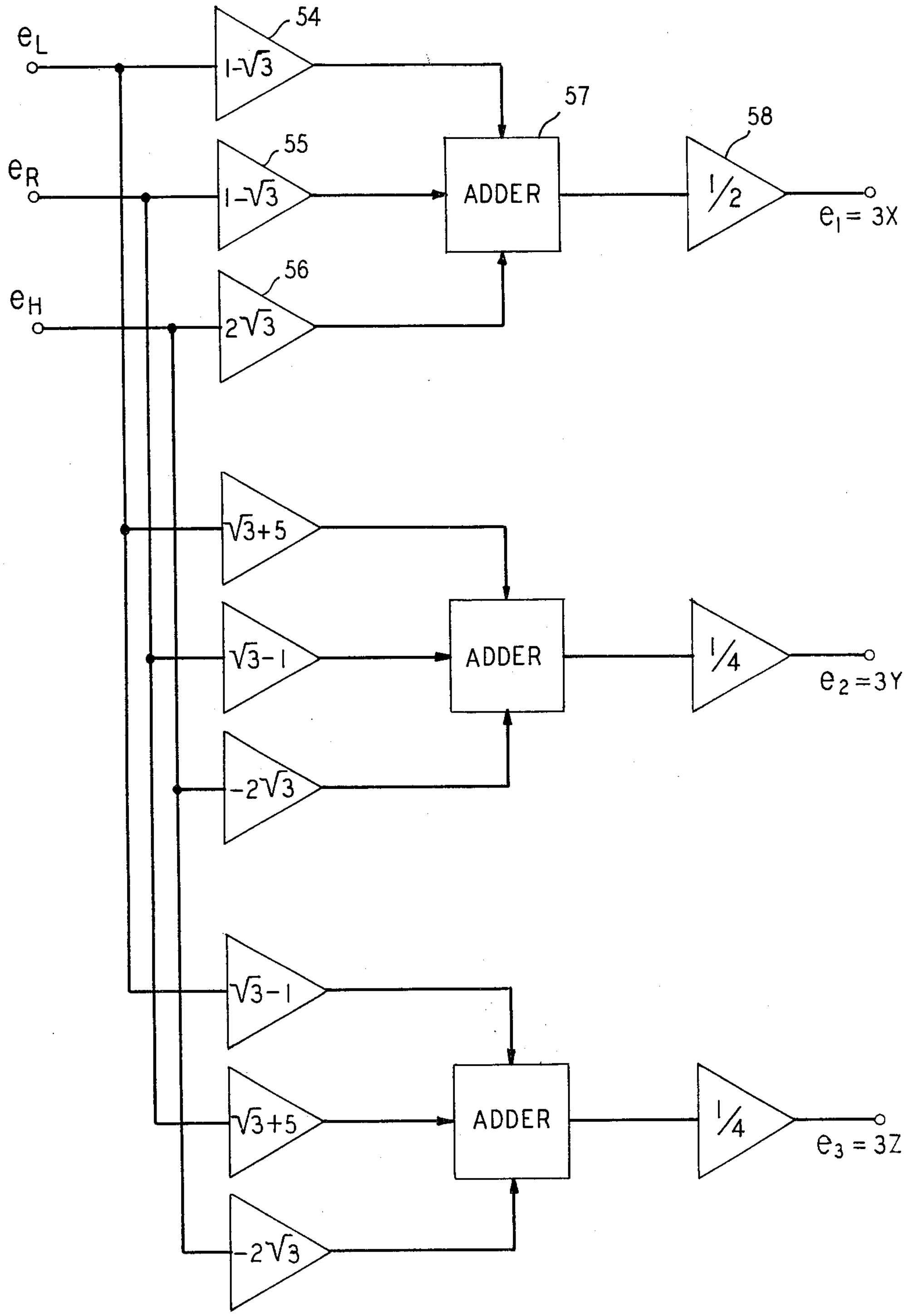
FIG. 5 is a detailed schematic diagram of the three-channel matrix of FIG. 3.

The three-channel matrix of FIG. 5 performs the mathematical operations of equations (9) so as to derive the output values $e_1 = 3X$, $e_2 = 3Y$ and $e_3 = 3Z$. For example, the input signals $e_L$, $e_R$ and $e_H$ are respectively multiplied by the factors of $(1-\sqrt{3})$, $(1-\sqrt{3})$ and $2\sqrt{3}$ in amplifiers 54, 55 and 56; the amplifiers outputs are linearly combined in adder 57; and the sum signal is then divided by two in amplifier 58 so as to arrive at the resultant output signal $e_1 = 3X$. The output signals of $3Y$ and $3Z$ are developed in a corresponding manner from the signals $e_L$, $e_R$ and $e_H$. The matrix illustrated schematically in FIG. 5 is comprised primarily of operational amplifiers. It should be appreciated, however, that the same functions could just as readily have been carried out in a properly designed resistance matrix, or in any other known type of function matrix.

As indicated hereinbefore, the use of one-third amplitude of the third harmonic of 19 kHz for the second pilot signal does not require any additional reduction in the peak amplitude of the audio channels. However, since a signal in phase-quadrature has effectively been added to the composite modulation of a two-channel transmission, the maximum deviation per audio signal will have to be slightly reduced. If the maximum normalized amplitude of each audio signal is taken as unity, then with no double-sideband signals present the maximum amplitude of $X+Y+Z$ can be 3.0 (when $X=1$, $Y=1$, and $Z=1$). When both quadrature double-sideband signals are also present, it can be shown that the peak amplitude of the composite signal can reach $1 + 4/\sqrt{3} = 3.31$ (when, for example, $X=1$, $Y=1$, and $Z=-1$). To restrict the peak deviation due to the monophonic channel and the double-sideband signals to 3.0 or below, the peak amplitude per audio channel will have to be reduced from 1.0 to 0.907. This corresponds to a decrease in output signal-to-noise ratio for a monophonic and two-channel stereophonic listener of 0.85 db. Thus, there is no really significant degradation (less than 1 db) to the output signal-to-noise ratios of the monophonic and two-channel stereophonic receivers during a three-channel transmission.

The foregoing disclosure is intended to be merely illustrative of the principles of the present invention and numerous modifications or alterations might be made therein without departing from the spirit and scope of the invention.

What is claimed is:

1. A three-channel FM stereo transmission system comprising means for transmitting a carrier frequency-modulated in accordance with the modulation function $$e_m = (X + Y + Z) + K_1 X \cos \omega_s t + K_1 Y \cos\left(\omega_s t - \frac{2}{3}\pi\right) + K_1 Z \cos\left(\omega_s t - \frac{4}{3}\pi\right) + M\left(\sin\frac{\omega_s t}{2} + K_2 \sin\frac{3}{2}\omega_s t\right)$$

where $X$, $Y$ and $Z$ are three independent audio signals, $K_1$ and $K_2$ are predetermined constants, $M$ is the amplitude of a phase reference pilot signal $\sin(\omega_s t/2)$, and $\omega_s = 2\pi f_s$ where $f_s$ is the fundamental frequency of subcarrier signals $\cos \omega_s t$, $\cos(\omega_s t - ⅔\pi)$ and $\cos(\omega_s t - 4/3\pi)$, each subcarrier signal being suppressed-carrier double-sideband amplitude-modulated by a respective one of said audio signals; and receiver means operative in response to the reception of said frequency-modulated carrier for reproducing each of said three audio signals.

2. A stereo transmission system as defined in claim 1 wherein the constant $K_1 = 2/\sqrt{3}$.

3. A stereo transmission system as defined in claim 2 wherein the constant $K_2 = ⅓$.

4. A stereo system as defined in claim 3 wherein said receiver means includes means for alternatively reproducing conventional monophonic and two-channel stereophonic broadcasts.

5. In a three-channel FM stereo transmission system, a transmitter for generating and broadcasting a carrier frequency-modulated in accordance with the modulation function $$e_m = (X + Y + Z) + \frac{2}{\sqrt{3}} X \cos \omega_s t + \frac{2}{\sqrt{3}} Y \cos\left(\omega_s t - \frac{2}{3}\pi\right) + \frac{2}{\sqrt{3}} Z \cos\left(\omega_s t - \frac{4}{3}\pi\right) + M \sin\frac{\omega_s t}{2} + \frac{M}{3} \sin\frac{3}{2}\omega_s t$$

where $X$, $Y$ and $Z$ are three independent stereophonically related audio signals, $M$ is the amplitude of a $\sin(\omega_s t/2)$ pilot signal, and $\omega_s = 2\pi f_s$ where $f_s$ is the fundamental frequency of the $\cos \omega_s t$, $\cos(\omega_s t - ⅔\pi)$ and $\cos(\omega_s t - 4/3\pi)$ subcarrier signals, each subcarrier signal being suppressed-carrier double-sideband amplitude-modulated by a respective audio signal.

6. A stereo system as defined in claim 5 including receiver means for reproducing monophonic, two-channel stereophonic and three-channel stereophonic broadcasts, said receiver means being switched to a three-channel stereophonic mode of operation in response to the reception of a frequency-modulated carrier comprising a $\sin(3/2)\omega_s t$ signal.

7. In a three-channel FM stereophonic transmission system, a transmitter comprising three independent sources of stereophonically related audio frequency waves, means for adding the audio waves together to obtain a sum signal, means for generating three subcarriers of the same frequency and spaced 120° apart in phase, means for amplitude-modulating each subcarrier with a respective one of said audio waves to develop three double-sideband suppressed-carrier signals, the frequency of said subcarriers being sufficiently high as to assure a frequency gap between the lower sidebands of the modulated subcarrier signals and said sum signal, a phase reference pilot signal having a frequency which lies within said frequency gap, means for amplitude multiplying each double-sideband signal by a factor of $2/\sqrt{3}$, means for generating a three-channel mode switching signal which comprises an integral harmonic of said pilot signal, and means for frequency modulating the aforementioned signals onto a high frequency carrier for the purpose of transmitting the same to one or more remote receivers.

8. A stereophonic system as defined in claim 7 including receiver means operative in response to the reception of said high frequency carrier to reproduce each of the audio frequency source signals.

9. A stereophonic system as defined in claim 8 wherein said receiver means includes means for reproducing conventional monophonic and two-channel stereophonic broadcasts.

10. A stereophonic system as defined in claim 9 wherein said receiver means is normally enabled to reproduce received monophonic or two-channel stereophonic broadcasts, with said receiver means including a switching means operatively responsive to said mode switching signal to switch said receiver means to a three-channel stereophonic reception mode.

11. A stereophonic system as defined in claim 10 wherein said phase reference pilot signal is of a frequency one-half that of the subcarrier frequency, with said mode switching signal equal to one-third the amplitude of the third harmonic of said phase reference pilot signal.

* * * * *